United States Patent

Heeringa et al.

[11] Patent Number: 5,654,029
[45] Date of Patent: Aug. 5, 1997

[54] SALAD DRESSING

[75] Inventors: Auke Jan Heeringa, Rotterdam, Netherlands; Pascale Fournier, Boulogne, France; Gerrit Daniel Harcksen, Rotterdam, Netherlands

[73] Assignee: Unilever Patent Holdings B.V., Vlaardingen, Netherlands

[21] Appl. No.: 424,422

[22] PCT Filed: Oct. 11, 1993

[86] PCT No.: PCT/EP93/02781

§ 371 Date: Jun. 13, 1995

§ 102(e) Date: Jun. 13, 1995

[87] PCT Pub. No.: WO94/08470

PCT Pub. Date: Apr. 28, 1994

[30] Foreign Application Priority Data

Oct. 14, 1992 [EP] European Pat. Off. ............... 92203148
Jun. 18, 1993 [EP] European Pat. Off. ............... 93201749

[51] Int. Cl.$^6$ .................................................. A23L 1/24
[52] U.S. Cl. ................................... 426/589; 426/601
[58] Field of Search .................................. 426/601, 602, 426/607, 613, 589

[56] References Cited

U.S. PATENT DOCUMENTS

| | | | |
|---|---|---|---|
| 3,955,010 | 5/1976 | Choizianin | 426/605 |
| 4,129,663 | 12/1978 | Jamison | 426/602 |
| 4,145,451 | 3/1979 | Oles | 426/321 |
| 4,451,493 | 5/1984 | Miller et al. | 426/602 |
| 4,477,478 | 10/1984 | Tiberio | 426/602 |
| 4,701,338 | 10/1987 | Del Vento | 426/602 |
| 4,762,726 | 8/1988 | Soucie et al. | 426/602 |
| 5,104,679 | 4/1992 | Jurcso | 426/613 |
| 5,308,639 | 5/1994 | Fung | 426/602 |

FOREIGN PATENT DOCUMENTS

| | | |
|---|---|---|
| 996893 | 6/1965 | United Kingdom . |
| 1341964 | 12/1973 | United Kingdom . |
| 1473208 | 5/1977 | United Kingdom . |
| 92 7475 | 5/1992 | WIPO . |

OTHER PUBLICATIONS

Database WPI, Week 7821, Derwent Publications, AN 78-37663A & JP,A,53 041 461, see abstract.

Database WPI, Week 8321, Derwent Publications, AN 83-50080K & JP,A,58 063 367, see abstract.

Database WPI, Week 8512, Derwent Publications, AN 85-072250 & JP,A,60 027 370, see abstract.

*Primary Examiner*—Jeanette Hunter
*Attorney, Agent, or Firm*—Cushman Darby & Cushman IP Group Pillsbury Madison & Sutro LLP

[57] ABSTRACT

The present invention relates to stable pourable emulsions of the type vinaigrette. Stability is attained by incorporating into the continuous oil phase a small amount of solid fat, such as hardened rapeseed oil. The product resembles to a large extent traditional home-made vinaigrette.

10 Claims, No Drawings

SALAD DRESSING

The present invention refers to a pourable water-in-oil emulsion which is known as "vinaigrette" and which is a very familiar and appreciated salad dressing. Traditionally such salad dressing is made by mixing about 75 wt. % of oil and about 25 wt. % of vinegar until an emulsion results. The emulsion optionally is flavoured with usual dressing ingredients. Because of quick phase separation such dressing is made immediately before use.

A known industrially prepared imitation vinaigrette comprises a water continuous emulsion containing 25–50 wt. % dispersed oil and a stabiliser, such as a gum, a modified starch or a suitable protein. However, the product does not resemble the home-made vinaigrette in its appearance, taste and wetting behaviour. It has a milky appearance and is experienced as synthetic. As a result of the poor wetting behaviour the dressing does not properly adhere as a thin film on the leaves of the salad, but drips to the bottom of the salad bowl.

Efforts to stabilise home-made vinaigrette by incorporating an emulsifier into the emulsion have failed, because the desired pourable rheology was lost and a mayonnaise-like product was obtained.

It is therefore an object of the present invention to provide a vinaigrette type pourable emulsion having a good taste, appearance and consistency. It is a further object of the invention to provide an oil phase suitable for the preparation of such emulsion. Another object of the invention is to provide a process for the preparation of the above pourable emulsion.

According to the present invention it has become possible to prepare an oil phase suitable for use in the preparation of a stable pourable emulsion with a dispersed acid water phase. By a stable emulsion is meant a dispersion which after its preparation can be kept at a temperature of 2°–20° C. under quiescent conditions for at least one day without any substantial phase separation being observed. Preferably emulsion stability is maintained for at least six months and still more preferably for at least nine months. Phase separation is here defined to be substantial when on a sample of the present vinaigrette a separated layer is clearly visible of which the thickness is at least 2% of the height of the remainder of the sample.

In order to be appreciated as a salad dressing the water phase should be acid, having a pH which preferably is 3.5 or less.

The emulsion according to the invention is preferably characterised by containing an oil phase which is structured by solid fat.

The invention is preferably applied to water-in-oil emulsions containing 50–90 wt. % fat on total emulsion. The fat phase is a liquid oil in which solid fat is incorporated, preferably in such amount that the solids fat content at 20° C. ($N_{20}$) is 0.1–10, preferably 0.1–3.0, more preferably 1 and at 40° C. ($N_{40}$) of 0.1–3.0, preferably 0.5–2.0, more preferably 0.9, as established by a NMR measurement.

If not indicated otherwise, all wt. % throughout this specification and appending claims are calculated on the emulsion weight.

The amount of solid fat should be low enough to ensure that the eventual dressing has a pourable consistency.

The amount of solid fat ($N_{20}$ value) is established by the NMR-method as described in Fette, Seifen, Anstrichmittel 80, (1978), 180–186.

Solid fats suitable for incorporating into the vinaigrette oil are e.g. hardened rapeseed oil, hardened sunflower seed oil, hardened soy bean oil such as BO69, hardened palm oil such as PO58, and mixtures of them. Most preferred is fully hardened rapeseed oil (RP70). Suitable liquid oils are vegetable oils such as sunflower seed oil, rapeseed oil, soybean oil, olive oil and mixtures of them.

In this specification, unless otherwise indicated, the term 'fat' and the term 'oil', when used in a general sense, refer to edible fatty substances including natural or synthesized fats and oils consisting essentially of triglycerides such as, for example, soybean oil, sunflower oil, palm oil, coconut oil, and to non-toxic fatty materials having properties similar to triglycerides, which materials may be indigestible, such as for example polyol fatty acid polyesters. The terms fat and oil are used interchangeably, with the proviso that oil denotes a fat which is liquid at ambient temperatures.

In this specification the term 'polyol fatty acid polyester' is intended to refer to any polyester or mixtures thereof, of which on an average more than 70% of the polyol hydroxyl groups have been esterified with fatty acids. In this regard by 'indigestible' is meant that at least about 70% by weight of the material concerned is not digested by the human body.

The invention comprises also a method for the preparation of a stable, pourable emulsion having a continuous fat phase which comprises the steps A. dissolving a solid fat into a liquid vegetable oil at a temperature where all solid fat has melted, whereby the amount of solid fat is chosen such that the eventual oil is as defined hereinbefore, B. cooling under high shear conditions within 5–120 seconds, preferably 5–30 seconds, to a temperature of −5° C. to −15° C., preferably to about −10° C., C. warming up under low shear conditions during at least two minutes to a temperature of −5° C. to +5° C., preferably about 0° C., D. mixing at 10°–40° C. under low shear conditions 50–90 weight parts of the prepared fat phase with 10–50 weight parts of an acid water phase which has a pH of 3.5 or less until the water phase is fully dispersed into the oil phase and an emulsion is obtained with a stability of at least one day.

A suitable apparatus for rapid cooling under high shear conditions is a Votator™ A-unit, which operates at a rotor speed of 1300–1700 rpm, preferably of 1500 rpm. A suitable temperature of the cooling liquid is −20° C. A suitable apparatus for the warming up step is a Votator™ C-unit, which operates at a rotor speed of 30–100 rpm, preferably 50 rpm.

For obtaining a vinaigrette type pourable emulsion the obtained oil phase obtained according to step C. is emulsified according to step D. with an acid water phase. Or, alternatively, step D. is postponed and the emulsion is prepared shortly before kitchen or table use. The latter option has the special advantage, that the oil phase can be combined with any desired acid water phase, preferably by choosing the vinegar type most preferred by the user of the product.

Therefore, a particular embodiment of the invention is the use of oil with a solids fat content at 20° C. ($N_{20}$) of 0.1–10, preferably 0.1–3.0, for preparing a stable dressing containing a continuous edible fat phase and a dispersed acid water phase.

The emulsion is prepared by stirring the ready water phase at 10°–40° C., preferably at ambient temperature, into the fat phase under low shear conditions, preferably with a high convection effect. Suitably a low shear, low speed blender of a type which is usually applied for dressing manufacture is used for that purpose. Stirring is continued until the water phase is totally dispersed into the oil and a yellow oily product is obtained. The water droplets advantageously have an average size of 5–30 μm, preferably 15 μm. Stirring for a too long time or with too much shear yields an undesirably pale coloured dressing on account of the particles becoming too small. To prevent destroying the structure of fat crystals care should be taken that the temperature does not rise over 40° C.

Applicant not wishing to be bound by theory believes that the high melting fat forms in the oil a fragile agglomerate of fine crystals in which the aqueous droplets are captured, so that phase separation is prevented.

For the preparation of an acid water phase an edible acid should be used. Preferably vinegar is used, preferably in an amount of 10–25 wt. %, more preferably 12.5 wt. %. Optionally, 10–90 wt. % of the vinegar is substituted by one or more other edible acids, provided the pH of the eventual water phase is not higher than 3.5. If not indicated otherwise, all wt. % through this specification and appending claims are calculated on the emulsion weight. Optionally, other flavouring ingredients such as salt, pepper, mustard, herbs and spices are incorporated into the emulsion. The total amount of other flavouring ingredients preferably is 0.01–4 wt. %.

When the water phase is not immediately mixed with the ready oil phase it is convenient to add at least a part of the optional ingredients to the oil phase. Preferably, the optional ingredients are admixed with the acid water phase which is then emulsified with the oil phase yielding the pourable emulsion of the invention.

Typically the emulsion does not need an emulsifier to obtain its stability. But, according to another embodiment of the invention some emulsifier, preferably 0.2–1.0 wt. %, more preferably about 0.5 wt. %, may be added to enhance the emulsion stability, particularly when the water content is over 20%. In that case it is used as a supplement to the stabilisation which is primarily based on the solid fat crystals and no undesired rheology effect has been observed.

An emulsifier is preferably added to the fat phase. Suitable emulsifiers are e.g. monoglycerides, diglycerides, phospholipids and polyglycerol esters.

If desired the water phase may be stabilised by incorporating any water phase stabiliser. Suitable stabilisers are e.g. gelatin, gums, alginate, pectin, modified starches and proteins.

The dressing of the invention has a good pourability and fluidity. The mouthfeel is pleasant: fatty and full. With respect to taste, appearance and wetting behaviour it resembles traditionally home-made vinaigrette. Stability is ensured for at least six and preferaby nine months.

EXAMPLE 1

The oil and water phase are prepared separately. After both phases have been prepared the final product may be prepared either immediately or at wish shortly before use.

The oil phase is prepared by dissolving 1 wt. % fully hardened rapeseed oil, melting at 70° C. (RP70) in sunflower oil at 80° C. in a stirred vessel. After all RP70 has been dissolved in the oil, resulting in a clear oil the oil phase is intermittently cooled to 55° C. and then is pumped through 2 Votator™ A-units in series followed by a crystallisation unit (C-unit). In the first A-unit the oil is cooled from 55° C. to −8° C. at high rotor speed (1400 RPM). The residence time of the oil in the A-units is 20 to 30 seconds. In the second A-unit the oil phase is kept at low temperature (−5° C.) at high rotor speed (1400 RPM). The rapid and deep cooling at high rotor speed are strongly preferred to obtain an oil phase in which the RP70 crystals are very finely dispersed. Two A-units in series will result in more finely dispersed RP70 crystals than one single A-unit. When dispersing the RP70 crystals is carried out under these conditions a stable emulsion will result. After the second A-unit the oil phase enters the C-unit. The residence time in the C-unit is 2 to 3 minutes and the temperature of the oil during this period is kept at 0° C. The oil phase is stirred at very low rotor speed (50 rpm) allowing the RP70 crystals to fully crystallise in the oil. After the C-unit the oil has a temperature of 5° C. and is stored until use. Storage temperature is ambient temperature, but should not exceed 40° C.

The water phase is prepared at ambient temperature. 50 wt. % 10° vinegar, 4 wt. % mustard, 4 wt. % salt and 0.4 wt. % white pepper are added to 41.6% wt. % (tap) water. Optionally herbs, flavours and spices can be added. The water phase is mixed thoroughly and stored at room temperature.

The final product is prepared by slowly adding 25 wt. % water phase to 75 wt. % oil phase under stirring at ambient temperature. Mixing is preferably carried out with a ribbon stirrer or another low shear stirrer. Mixing is continued for 5 minutes after the water phase has been dispersed completely in the oil phase. The final emulsion is stored cool, preferably at 5° C., anyway storage temperature should not exceed 40° C.

After six months the emulsion did not show any phase separation.

EXAMPLE 2

The oil phases according to compositions 1–6 were prepared:

| composition | oil | wt % spe1 | spe2 |
|---|---|---|---|
| 1 | 0 | 93 | 7 |
| 2 | 20 | 74 | 6 |
| 3 | 40 | 55 | 5 |
| 4 | 50 | 46 | 4 |
| 5 | 60 | 37 | 3 |

Both spe1 and spe2 are sucrose polyesters.

The oil is sunflower oil. The fatty acids of spe1 have the following composition:

| Fatty acid | spe1 weight % |
|---|---|
| Lauric acid | 0.2 |
| Myristic acid | 0.2 |
| Palmitic acid | 11.8 |
| Stearic acid | 8.6 |
| Arachidic acid | 0.3 |
| Oleic acid | 53.8 |
| Elaidic acid | — |
| Linoleic acid | 22.9 |
| Linolenic acid | 1.0 |
| Others | 1.2 |
| Total | 100 |

The octaester content of this material is 78.1 wt. %, the OH value 6.1 and the clearpoint as measured with DSC of about 20° C.

The fatty acids of spe2 have the following composition:

| Fatty acid | spe2 weight % |
| --- | --- |
| Caprylic acid | — |
| Lauric acid | 0.3 |
| Myristic acid | 1.4 |
| Palmitic acid | 48.9 |
| Stearic acid | 48.9 |
| Arachidic acid | 0.4 |
| Elaidic acid | 0.1 |

Spe2 has a OH-value of 4.1 and a clearpoint (DSC) of 55° C.

The processing was as follows: Spe1 and the oil were mixed. Spe2 is dissolved in the mixture at 80° C. in a stirred vessel. The rest of the processing was as in example 1. The six oil phases may be used as such e.g. as a pourable oil, or, according to example 1, may be mixed with a water phase to prepare the six corresponding vinaigrette compositions. Suitable results may be obtained by mixing the above oil phase with the water phase of example 1 in a weight ratio of 3:1.

After six months none of the emulsions did show any phase separation.

We claim:

1. A vinaigrette salad dressing which is a stable pourable water-in-oil emulsion comprising a continuous edible fat phase and a dispersed acid water phase, wherein the acid water phase has a pH which is not higher than 3.5.

2. Dressing according to claim 1, wherein the fat phase comprises 50–90 wt. % edible fat on total emulsion.

3. Dressing according to claim 1, wherein the edible fat phase is a liquid oil with a solids fat content at 20° C. ($N_{20}$) of 0.1–10 and at 40° C. ($N_{40}$) of 0.1–3, as established by a NMR measurement.

4. Dressing according to claim 1, wherein the edible fat phase contains fully hardened rapeseed oil.

5. Dressing according to claim 1, wherein the acid water phase comprises vinegar in an amount of 10–25 wt. % on total emulsion.

6. Dressing according to claim 1, wherein the emulsion comprises 0.01–4 wt. % of one or more ingredients selected from the group consisting of mustard, pepper, salt, herbs and spices.

7. Dressing according to claim 1, wherein the emulsion is stable for at least six months, preferably for at least nine months.

8. Method for the preparation of a stable, pourable emulsion having a continuous fat phase and a dispersed acid water phase comprising the steps a. dissolving a solid fat into a liquid vegetable oil at a temperature where all solid fat has melted, whereby the amount of solid fat is such that the resulting oil is a liquid oil with a solids fat content at 20° C. ($N_{20}$) of 0.1–10 and at 40° C. ($N_{40}$) of 0.1–3, as established by a NMR measurement, b. cooling under high shear conditions within 5–120 seconds to a temperature of −5° C. to −15° C., c. warming up under low shear conditions during at least two minutes to a temperature of −5° C. to +5° C., d. mixing at 10°–40° C. under low shear conditions 50–90 weight parts of the thus prepared fat phase with 10–50 weight parts of an acid water phase which has a pH of 3.5 or less until the acid water phase is fully dispersed into the fat phase and an emulsion comprising a continuous edible fat phase and a dispersed acid water phase is obtained.

9. An edible fat composition comprising a liquid oil with a solids fat content at 20° C. ($N_{20}$) of 0.1–10 and at 40° C. ($N_{40}$) of 0.1–3, as established by a NMR measurement, said fat composition also containing 0.01–4 wt. % of one or more dressing ingredients selected from the group consisting of mustard, pepper, salt, herbs and spices.

10. A stable vinaigrette emulsion according to claim 1, said emulsion comprising from 50–90 wt. % of the fat phase and 50–10 wt. % acid water phase.

* * * * *